(12) United States Patent
Lupash et al.

(10) Patent No.: US 6,798,377 B1
(45) Date of Patent: Sep. 28, 2004

(54) ADAPTIVE THRESHOLD LOGIC IMPLEMENTATION FOR RAIM FAULT DETECTION AND EXCLUSION FUNCTION

(75) Inventors: Lawrence O. Lupash, Sunnyvale, CA (US); Joseph Wlad, Alameda, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 0 days.

(21) Appl. No.: 10/449,340

(22) Filed: May 31, 2003

(51) Int. Cl.$^7$ ............................................. H04B 7/185
(52) U.S. Cl. ............................. 342/357.02; 342/357.13
(58) Field of Search ...................... 342/357.02, 357.06, 342/357.13, 357.14

(56) References Cited

U.S. PATENT DOCUMENTS

| | | | | |
|---|---|---|---|---|
| 6,166,683 | A | * 12/2000 | Hwang | 342/357.04 |
| 6,169,957 | B1 | * 1/2001 | Arethens | 342/357.02 |
| 6,205,377 | B1 | 3/2001 | Lupash et al. | |
| 6,281,836 | B1 | 8/2001 | Lupash et al. | |

OTHER PUBLICATIONS

M.A. Sturza et al., Comparison of Fixed and Variable Threshold RAIM Algorithms, Proceedings of Institute of Navigation GPS–90, p. 437–443, Sep. 1990.*

"GPS RAIM: Calculation of Threshold Protection Radius Using Chi–Square Methods—A Geometric Approach" by R Grover Brown and Gerald Y. Chin, Sep. 1997, pp. 155–178.

* cited by examiner

Primary Examiner—Gregory C. Issing
Assistant Examiner—Fred H Mull
(74) Attorney, Agent, or Firm—Boris G. Tankhilevich

(57) ABSTRACT

A method for improving a satellite receiver autonomous integrity monitoring (RAIM) availability and fault detection and exclusion (FDE) function by using an adaptive threshold logic. The method comprises the following steps: (A) pre-computing a database of thresholds; (B) selecting in real time from the database a plurality of thresholds corresponding to a set of available measurements; and (C) determining an optimum RAIM/FDE function corresponding to the set of available measurements by using the adaptive threshold logic that utilizes the plurality of thresholds corresponding to the set of available measurements. The set of available measurements is selected from the group consisting of: {a GPS measurement, a GLONASS measurement, a GALILEO measurement, a baro measurement, a clock measurement, and a pseudolite measurement}.

11 Claims, 4 Drawing Sheets

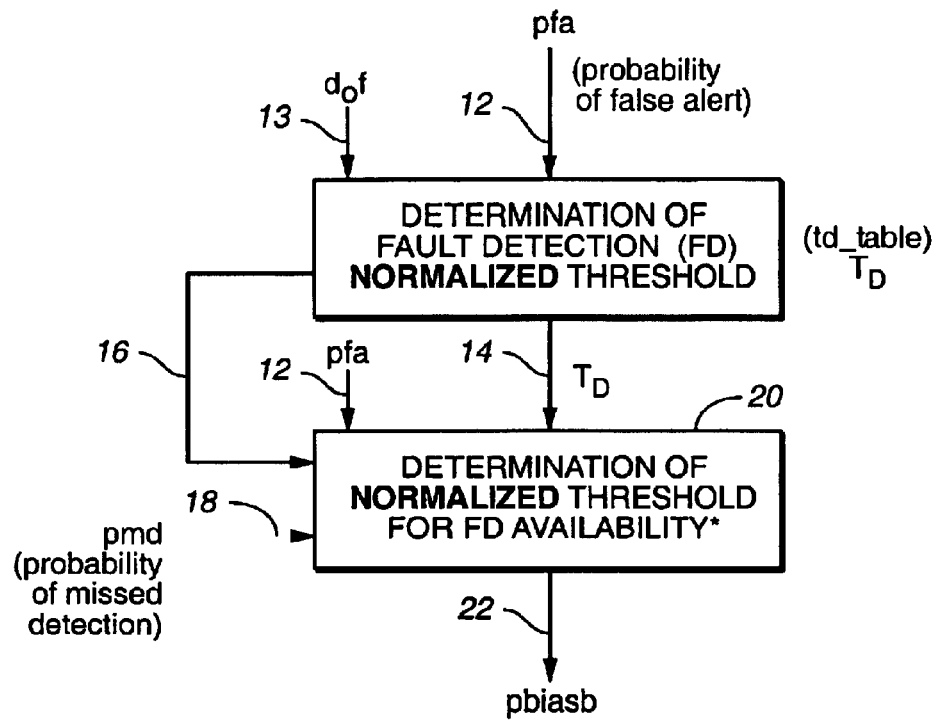
FIG._1A
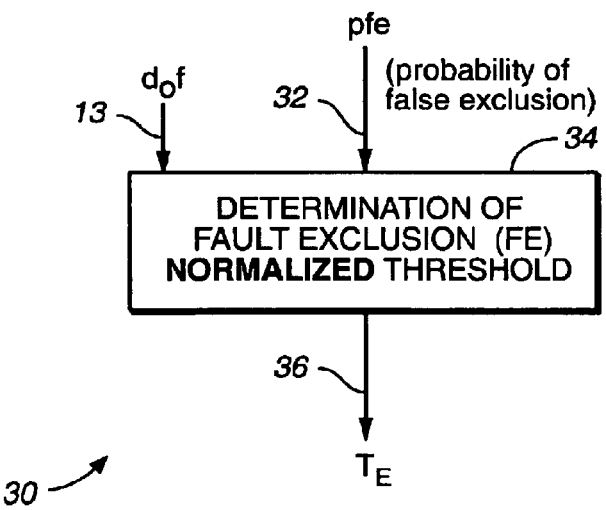
FIG._1B

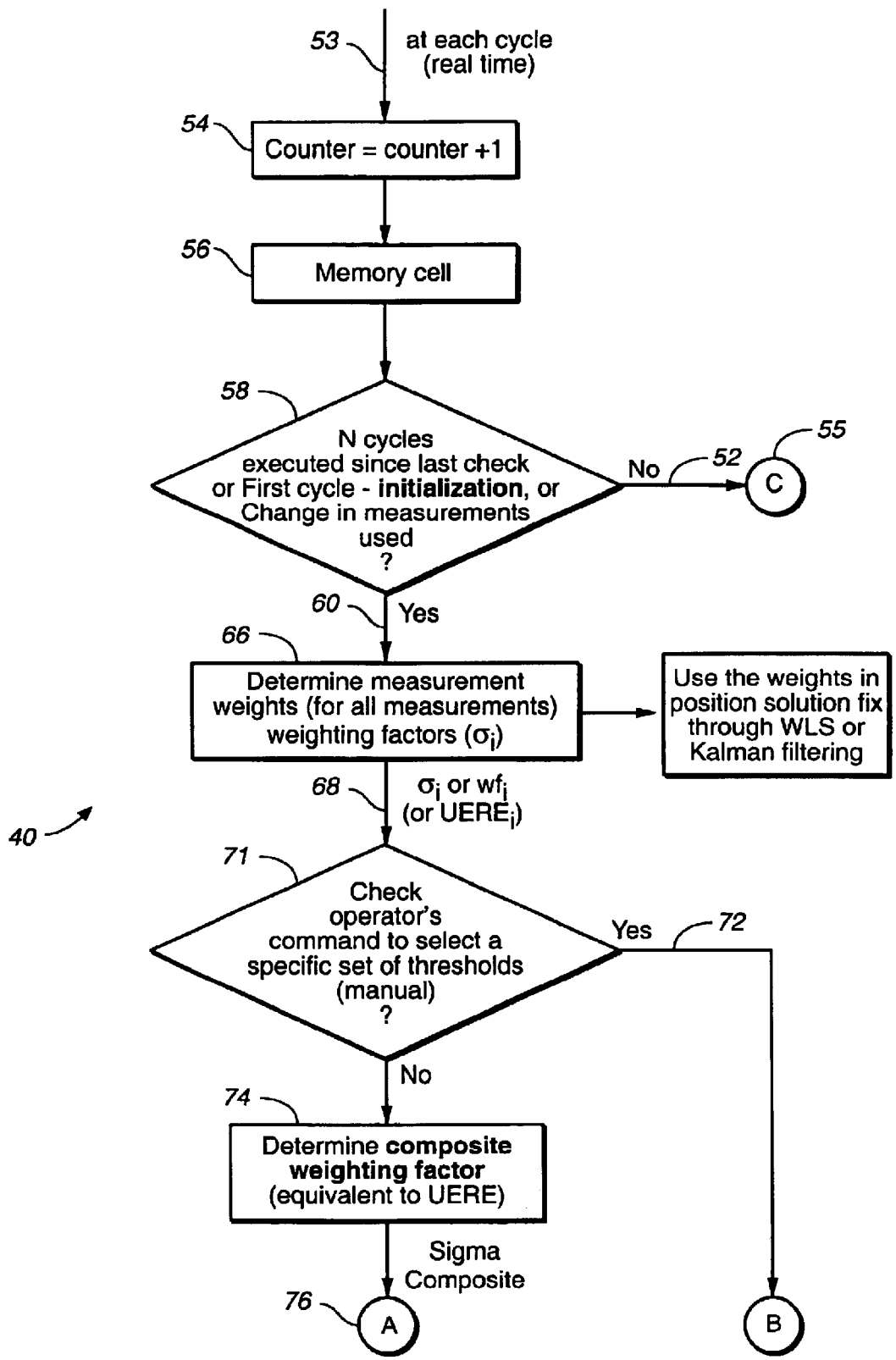
FIG._2

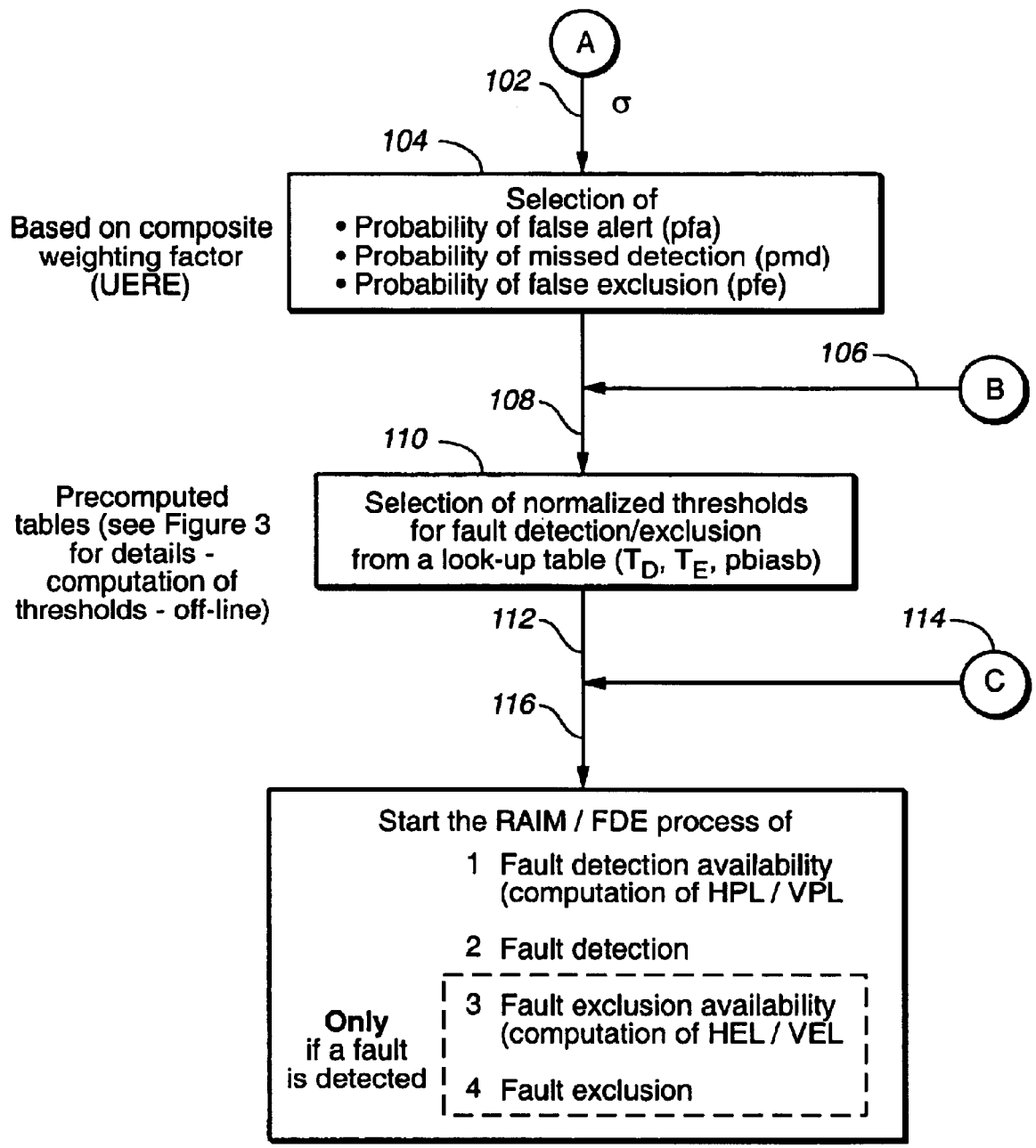
FIG._4

ADAPTIVE THRESHOLD LOGIC IMPLEMENTATION FOR RAIM FAULT DETECTION AND EXCLUSION FUNCTION

BACKGROUND OF THE INVENTION

1. Field of the Invention

The present invention is in the field of satellite navigation. More specifically, the present invention relates to the field receiver autonomous integrity monitoring (RAIM) fault detection and exclusion implementation.

2. Discussion of the Prior Art

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to ;provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (approximately nineteen centimeter carrier wavelength) and an L2 signal having a frequency f2=1227.6 MHz (approximately twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1, 2, \ldots 24)$ is the channel or satellite number. These frequencies lie in two bands at 1.597–1.617 GHz (L1) and 1,240–1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals. Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The given above discussion assumes that a satellite navigational system used for the navigation purposes is functioning properly. GPS satellites are designed to provide users with warnings of satellite malfunctions. However, sometimes, the warnings may take more than 5 minutes before the user is aware of a malfunction. Aviation applications require a more timely notification of a satellite failure condition. Thus, a means to independently monitor satellite integrity is required.

One of these means is receiver autonomous integrity monitoring (RAIM). The RAIM method is based on a self-consistency check among the available measurements. The RAIM consistency check uses redundant measurements as a means to determine GPS integrity. The discussion given below can be found in "Global Positioning System: Theory and Applications", Volume II, chapter 5, by Bradford W. Parkinson and James J. Spilker Jr., published by the American Institute of Aeronautics and Astronautics, Inc. in 1996.

There are two main approaches to RAIM (not considering several hybrid approaches). In the first main method, the snapshot scheme, only current redundant measurements are used for the self-consistency check. In the second main method, the averaging or filtering scheme, both past and present measurements are used in the RAIM decision.

The theoretical foundation for RAIM is the statistical detection theory. Two hypothetical-testing questions are posed: (1) Does a failure exist? and (2) If so, which is the failed satellite? The basic assumption is that there is only one failed satellite at a time. Determination of which satellite has failed is more difficult than a simple failure detection, and it requires more measurement redundancy.

In a basic snapshot RAIM scheme the noisy redundant range-type measurements are available at a given sample point in time. It is convenient to use the six-satellites-in-view-case as an example, that is the number of satellites in view n=6. The generalization to n=5 or n>6 is fairly obvious.

In a range comparison method for six satellites there are six linearized over-determined equations in four unknowns. If there is no noise, one can solve the first four equations to obtain a solution that satisfies the first four equations. The resulting solution can be used to predict the remaining two measurements, and the predicted values can be compared with the actual measured values. If the two differences (residuals) are small, the detection algorithm detects "no failure". On the other hand, if either or both of the residuals are large, it declares "failure". The notion of "small" and "large" are defined by deciding whether the typical sample point lies inside or outside the decision boundary in the two-dimensional test statistic plane. This is the essence of the range comparison method.

In the least-squares -residuals RAIM method for the same six-in-view satellites example, one obtains the least squares "solution" for six equations in four unknowns. The least-squares solution can be used to predict the six measurements. Six residuals are then grouped together as a six-to-one vector in the measurement domain. The linear transformation takes the range measurement into the resulting residual vector. The sum of the squares of the residuals plays the role of the basic nonnegative scalar observable in the least-squares -residuals RAIM method. The positive semi-infinite real line can be partitioned into two parts, one for "no failure", and the other for "failure". The dividing point is called the threshold. In this method one can use a constant alarm-rate strategy by precalculating the thresholds (partitions) that yield the desired alarm rate for the various anticipated values of N. (In general, N is equal to the number of measurements). Then the real-time algorithm sets the threshold appropriately. For the zero-mean Gaussian assumption the sum of the squares of the residuals has an unnormalized Chi-square distribution with (N−4) degrees of freedom. One can use chi-square statistics to find the threshold based on false alert rate and missed detection rate for the N-number of measurements used. The sum of the squares of the residuals, which is a scalar, is used as the test statistic which is compared to the threshold. Thus, the least-squares-residuals RAIM method is easy to implement because its test statistic is a scalar, regardless of the number N of measurements used.

The RAIM parity method is more formal and less heuristic than either the range comparison method or the least-squares-residuals method. In this method, for the same six-in-view satellites example, the measurement vector is linearly transformed. The upper partitioned part of the transformation yields the usual least-squares solution. The lower partitioned is called the parity vector. For simple detection, one can obtain all the information about the parity vector by looking at its magnitude, or its magnitude squared. Thus, in the parity method, the test statistic for detection reduces to a simple scalar, as was the case with the least-squares-residuals method. The least-squares-residuals method and the parity method lead to identical observables, and with similar threshold settings, yield identical results. It can be shown, that the range-comparison space can be mapped to parity space. Thus, all three methods yield the same results.

Another RAIM implementation is the maximum separation of solution RAIM method. If there are n satellites in view, one can consider the n subset solutions obtained by omitting one satellite at a time from the full set. If a failure exists, the failed satellite is omitted from one of the subsets, and the solution thus obtained is declared a "good" solution. All other subsets contain the failed satellite, and they are in error to various degrees. If the pseudorange error in the failed satellite gradually increases with time, one would expect the subset solutions to begin to spread apart with time, and the maximum separation observed among the n solutions can be used as a measure of the solutions spread. The "good" solution remains near truth, because it does not contain the failed satellite. If there is no failure present, the solutions should remain grouped around the true position. Thus, the maximum observed solution separation in the horizontal plane can be used as a scalar and nonnegative test statistic. The "no-failure" decision is separated from the "failure" decision with some detection probability by the threshold that can be set by utilizing the relationship between the radial error and the radial-error-protection level. The detection probability varies with satellite geometry. However, this method is not implemented in the prior art satellite receivers.

In the constant-detection-rate/variable-protection-level method, a snapshot RAIM scheme differs significantly from the four methods described above. In this method, the parity vector is used as the basic test statistic, and a threshold is set to yield the desired constant alarm rate. To keep the detection probability constant, as the satellite geometry varies, the smallest radial error, or the protection radius, is used as a failure criterion. The protection radius can be calculated, in real time, on an essentially continuous basis. When the protection radius exceeds the specified alarm limit, the alarm should be triggered, which would indicate the inadequate satellite geometry. On the other hand, if the test statistic exceeds the threshold, the alarm also would be triggered. If this is the case, the alarm would be indicative of a satellite malfunction. In either of those situations, an airplane should be equipped with an alternative source of navigation when the satellite-based navigation fails. This is called a GPS supplementary navigation. One type of the supplementary navigation of an airplane (if the test statistic exceeds the threshold) can be performed by using a satellite-calibrated barometric altimeter data (baro-data), as fully disclosed in the U.S. Pat. No. 6,281,836, issued to Lupash et al. Lupash et al. discloses the method of supplementing the satellite data by the satellite-calibrated baro data when the receiver autonomous integrity monitoring function (RAIM) is unavailable and when the horizontal protection level (HPL) does not satisfy the horizontal alert limit (HAL) requirement. The baro data is adjusted to compensate for the lack of baro calibration in the position solution domain. The HPL is re-computed using the satellite-calibrated adjusted baro data. The re-computed HPL could satisfy the HAL requirement which would make the RAIM function available when it would be otherwise unavailable. An airplane navigation system can perform the supplementary navigation by supplementing the GPS satellite data with the GLONASS-derived data, or with pseudolite-derived data. etc. Thus, if there are sufficient number of supplementary measurements available, the airplane navigation system could exclude the faulty GPS satellite data and still perform sufficiently precise navigation.

However, in order to isolate the faulty satellite data, the satellite navigation system at first has to determine if there are sufficient number of supplementary measurements available, so that the airplane navigation system could perform the RAIM fault detection and exclusion function (FDE). RAIM/FDE thresholds are determined using the inputs of maximum allowable false alert rate and probability of missed detection (pmd).

Historically, the inputs of maximum allowable false alert rate and probability of missed detection pmd) were fixed (normally through a Federal Aviation Administration requirement) which resulted in one set of thresholds for a given alert rate and probability of missed detection (pmd). On the other hand, in order to use a more accurately calculated RAIM fault detection and exclusion (FDE) function for GPS receiver either a probability of missed detection (pmd) or a maximum allowable alert rate should be allowed to change depending on satellite configuration, expected measurement accuracy or satellite messages.

Thus, what is needed is to develop a method of adaptive threshold logic implementation for RAIM fault detection and exclusion (FDE) function for GPS receiver that would take into account the variable probability of missed detection (pmd) or a variable maximum allowable alert rate depending on the satellite configuration, on the expected measurement accuracy, or on the satellite message structure.

SUMMARY OF THE INVENTION

To address the shortcomings of the available art, the present invention provides a method of adaptive threshold logic implementation for RAIM fault detection and exclusion (FDE) function for GPS that takes into account the variable probability of missed detection (pmd) or a variable maximum allowable alert rate depending on the satellite configuration, on the expected measurement accuracy, or on the satellite message structure.

One aspect of the present invention is directed to a method for improving a satellite receiver autonomous integrity monitoring (RAIM) availability and fault detection and exclusion (FDE) function by using an adaptive threshold logic.

In one embodiment of the present invention, the method comprises the following steps: (A) pre-computing a database of thresholds; (B) selecting in real time from the database a plurality of thresholds corresponding to a set of available measurements; and (C) determining an optimum RAIM/FDE function corresponding to the set of available measurements by using the adaptive threshold logic that utilizes the plurality of thresholds corresponding to the set of available measurements. The set of available measurements is selected from the group consisting of: {a GPS measurement, a GLONASS measurement, a GALILEO measurement, a baro measurement, a clock measurement, and a pseudolite measurement}.

In one embodiment of the present invention, the step (A) of pre-computing the database of thresholds further includes the following steps: (A1) selecting a navigation scenario from the group consisting of: {a Standard Positioning System (SPS) navigation scenario; a Precise Positioning System (PPS) navigation scenario; and a navigation scenario including a combination of the SPS navigation scenario and the PPS navigation scenario}; and (A2) generating a table of thresholds for the selected navigation scenario.

In one embodiment of the present invention, the step (A1) of selecting the navigation scenario further includes the step (A1, 1) of determining a degree of freedom parameter (dof) for the selected navigation scenario. The degree of freedom parameter dof is equal to an integer K of available measurements corresponding to the selected navigation scenario minus four measurements; wherein the integer K of available measurements corresponding to the selected navigation scenario is selected from the group consisting of: {a GPS measurement, a GLONASS measurement, a GALILEO measurement, a baro measurement, a clock measurement, and a pseudolite measurement}.

In one embodiment of the present invention, the step (A2) of generating the table of thresholds for the selected navigation scenario further includes the following steps: (A2, 1) selecting a probability of false alert (pfa) for the selected navigation scenario; (A2, 2) selecting a probability of missed detection (pmd) for the selected navigation scenario; and (A2, 3) selecting a probability of false exclusion (pfe) for the selected navigation scenario.

In one embodiment of the present invention, the step (A2) of generating the table of thresholds for the selected navigation scenario further includes the following steps: (A2, 4) for each degree of freedom parameter (dof), using the probability of false alert (pfa) to determine a table of fault detection (FD) normalized thresholds (td_table of $T_D$); and (A2, 5) for each degree of freedom parameter (dof), using the table of fault detection normalized thresholds (td_table of $T_D$), using the probability of missed detection (pmd), and using the probability of false alert (pfa) to determine a table of normalized thresholds for fault detection availability (pb_table of pbiasb) based on a parity vector method.

In one embodiment of the present invention, the step (A2) of generating the table of thresholds for the selected navigation scenario further includes the following step: (A2, 6) for each degree of freedom parameter (dof), using the probability of false exclusion (pfe) to determine a table of fault exclusion (FE) normalized thresholds (te_table of $T_E$).

In one embodiment of the present invention, for each timing cycle of the satellite receiver, the step (C) of determining the optimum RAIM/FDE function corresponding to the set of available measurements by using the adaptive threshold logic further includes the steps of: (C1) identifying a default set of available measurements by using a real time available GPS satellite constellation, and acquiring a plurality of GPS satellite signals by using a satellite receiver; (C2) if the number of default available measurements is greater than or equal to a first predetermined number, substantially continuously determining the optimum RAIM/FDE function corresponding to the set of available measurements; and (C3) if the number of default available measurements is less than the first predetermined number, and if at least one additional measurement is available, adding at least one additional measurement to the set of available measurements and repeating the steps (C1–C3). The additional measurement is selected from the group consisting of: {GPS measurement, GLONASS measurement, GALILEO measurement, a baro measurement, a clock measurement, and a pseudolite measurement}.

In one embodiment of the present invention, for each timing cycle, the step (C2) of continuously determining the optimum RAIM/FDE function corresponding to the set of available measurements further includes the following steps: (C2, 1) counting an integer L of timing cycles by using a counter; (C2, 2) tracking the set of used available measurements; and (C2, 3) if the integer L of timing cycles is not a multiple of a second predetermined number, or if the integer L of timing cycles is not equal to one, or if the set of tracked used available measurements does not change from a prior timing cycle, starting the process of determining the optimum RAIM/FDE function.

In another embodiment, of the present invention, if the integer L of timing cycles is a multiple of the second predetermined number, or if the integer L of timing cycles is equal to one, or if the set of tracked used available measurements does change from a prior timing cycle, the step (C2) of continuously determining the optimum RAIM/FDE function corresponding to the set of available measurements further includes the step (C2, 3) of starting a process of selecting a set of adaptive thresholds.

In one embodiment of the present invention, the step (C2, 3) of selecting the set of adaptive thresholds further includes the steps of: determining a set of measurement weights; checking if there is an operator's overrule command; if there is no operator's overrule command, determining a composite weighting scalar factor by using the set of measurement weights; based on the composite weighting scalar factor, selecting a navigation scenario from the group consisting of: {a Standard Positioning System (SPS) navigation scenario; a Precise Positioning System (PPS) navigation scenario; and a navigation scenario including a combination of the SPS navigation scenario and the PPS navigation scenario}; and based on the selected navigation scenario, and based on the degree of freedom (dof), selecting from the pre-computed off-line database of thresholds a set of thresholds including the table of fault detection (FD) normalized thresholds (td_table of $T_D$), including the table of fault exclusion (FE) normalized thresholds (te_table of $T_E$), and including the table of normalized thresholds for fault detection availability (pb_table of pbiasb).

In one embodiment of the present invention, the step of determining the set of measurement weights further includes the following steps: decoding from a received GPS navigation message a user range accuracy (URA) index for each satellite measurement that is used in a navigation solution; determining a user range error (URE) corresponding to a plurality of errors selected from the group consisting of {a plurality of space segment errors; and a plurality of control segment errors} for the URA index for each satellite measurement; evaluating a user equipment error (UEE) corresponding to a plurality of errors selected from the group consisting of {a receiver noise error; a multipath error; a ionosphere delay uncompensated error; and a troposphere delay uncompensated error} for each satellite measurement; and determining a user equivalent range error (UERE) based on the calculated URE and based on the calculated UEE for the URE value for each satellite measurement.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1A depicts a flow chart of the method of the present invention that illustrates the off-line steps of pre-computing a table of fault detection (FD) normalized thresholds (td_table of $T_D$), and a table of normalized thresholds for fault detection availability (pb_table of pbiasb) based on a parity vector method.

FIG. 1B illustrates the flow chart of the method of the present invention of the off-line step of generating a table of fault exclusion (FE) normalized thresholds (te_table of $T_E$)based on a parity vector method.

FIG. 2 is a flow chart of the method of the present invention that illustrates the real-time step of selecting from the pre-computed database a plurality of thresholds corresponding to a set of currently available measurements for each timing cycle of the satellite receiver.

FIG. 4 depicts the steps of the present invention including the selection of the quantities based on the calculated composite weight factors $\sigma_{composite}$ and the step of selection of normalized thresholds ($T_D$, $T_E$, pbiasb) from the pre-computed look-up tables (td_table), (te_table), and (pb_table).

DETAILED DESCRIPTION OF THE PREFERRED AND ALTERNATIVE EMBODIMENTS

Figure 3:
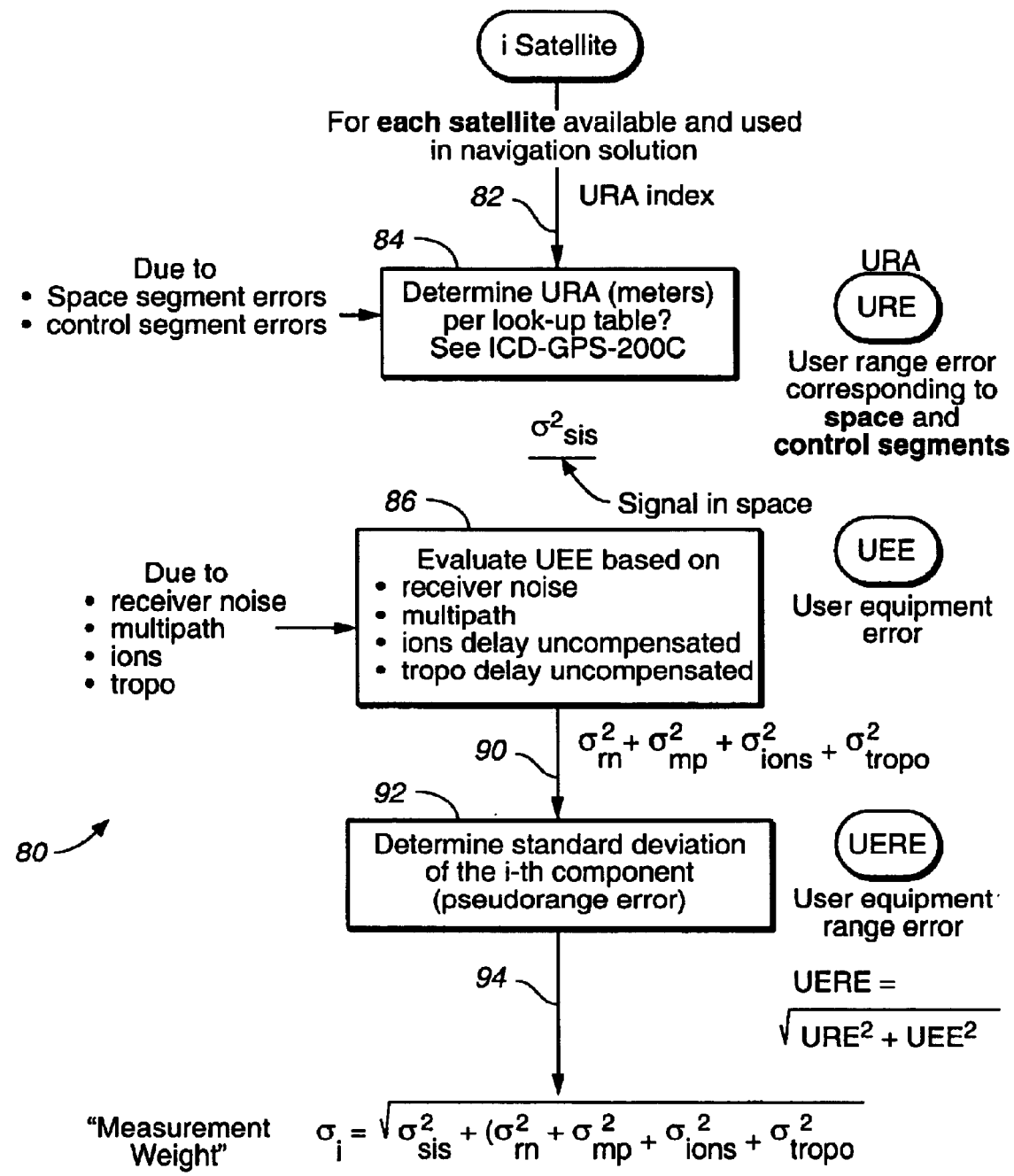
FIG. 3 illustrates the step of determining the composite weight factors $\sigma_{composite}$ for all available and used measurements in more details.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The goal of the present invention is to give a user more flexibility to make a trade-off between the receiver autonomous integrity monitoring (RAIM) availability and reduced false alert rate based on fundamental properties of the RAIM algorithm. For reference, please see "Global Positioning System: Theory and Applications", Volume II, chapter 5, by Bradford W. Parkinson and James J. Spilker Jr., published by the American Institute of Aeronautics and Astronautics, Inc. in 1996.

More specifically, one could trade the increased tolerance rate for the fault detection and exclusion function (FDE), including the increased tolerance rate the false alert rate comprising a fault detection rate, and if the fault is detected, the increased tolerance rate for the fault exclusion rate, in exchange for the improved RAIM availability rate.

The present invention includes the method for implementing this trade-off between the increased tolerance rate for the fault detection and exclusion function (FDE), in exchange for the improved RAIM availability rate, by implementing a new threshold computational logic for a RAIM snapshot algorithm. The normalized adaptive thresholds are dependent on the real time value of User Range Accuracy values (URA) (see discussion below); and are used in the process of RAIM fault detection and exclusion. The thresholds are determined based on look-up table or by on-line computation (when a better selection is desired).

The method of the present invention is comprised of several basic steps that are executed every integer N cycles, where N is selectable. Fault detection process and fault exclusion process can use different normalized thresholds based on the desired probability of false alert, probability of missed detection, and probability of fault exclusion. The basic steps are: (A) the off-line step of pre-computing a database of thresholds for a plurality of navigation scenarios selected from the group consisting of: {a Standard Positioning System (SPS) navigation scenario; a Precise Positioning System (PPS) navigation scenario, and a navigation scenario including a combination of the SPS navigation scenario and the PPS navigation scenario}; (B) a real-time step of selecting from the pre-computed database a plurality of thresholds corresponding to a set of available measurements that is based on an external real-time event; and (C) the real-time step of determining an optimum RAIM/FDE function corresponding to the set of available measurements by using the adaptive threshold logic that utilizes the plurality of thresholds corresponding to the set of available measurements. The set of available measurements is selected from the group consisting of: {a GPS measurement, a GLONASS measurement, a GALILEO measurement, a baro measurement, a clock measurement, and a pseudolite measurement}.

In one embodiment of the present invention, the step (A) of pre-computing the database of thresholds further includes the following steps: (A1) selecting a navigation scenario from the group consisting of: {a Standard Positioning System (SPS) navigation scenario (for instance, for GPS-based navigation, the SPS scenario utilizes a GPS receiver capable of receiving the C/A-code); a Precise Positioning System (PPS) navigation scenario (for instance, for GPS-based navigation, the PPS scenario utilizes a GPS receiver capable of receiving the P-code and a secret Y-code); and a navigation scenario including a combination of the SPS navigation scenario and the PPS navigation scenario}; and (A2) generating a table of thresholds for the selected navigation scenario.

The examples of the real-time events that would cause the selection of a new set of thresholds from the pre-computed database are: (1) the discontinuity of at least one GPS satellite tracking because the tracked GPS satellite became unavailable due to changes in the geometry of the GPS receiver; (2) changes in the navigation scenario from the Standard Positioning System (SPS) navigation scenario to the Precise Positioning System (PPS) navigation scenario would cause the selection of new, more strict thresholds levels from the pre-computed database; etc.

In one embodiment of the present invention, the step (A1) of selecting the navigation scenario further includes the step (A1, 1) of determining a degree of freedom parameter (dof) for the selected navigation scenario. The degree of freedom parameter dof is equal to an integer K of available measurements corresponding to the selected navigation scenario minus four measurements. The integer K of available measurements corresponding to the selected navigation scenario is selected from the group consisting of: {a GPS measurement, a GLONASS measurement, a GALILEO measurement, a baro measurement, a clock measurement, and a pseudolite measurement}.

If the degree of freedom parameter (dof)=1, one should use the Gaussian distribution. If degree of freedom parameter (dof)≧2; one should use the non-central Chi-square distribution.

FIG. 1A depicts a flow chart 10 of the method of the present invention that illustrates the off-line steps of pre-computing a table of fault detection (FD) normalized thresholds (td_table of $T_D$), and a table of normalized thresholds for fault detection availability (pb_table of pbiasb) based on a parity vector method. In one embodiment of the present invention, the step of generating the table of thresholds for the selected navigation scenario further includes the following steps: for each degree of freedom parameter (dof) 13, using the probability of false alert (pfa) 12 to determine a table of fault detection (FD) normalized thresholds (td_table of $T_D$) 14; and for each degree of freedom parameter (dof) 13, using the table of fault detection normalized thresholds (td_table of $T_D$) 14, using the probability of missed detection (pmd) 18, and using the probability of false alert (pfa) 12 to determine a table of normalized thresholds for fault detection availability (pb_table of pbiasb) 22 based on a parity vector method.

In the paper given by R. Grover Brown, "GPS RAIM: Calculation of Threshold and Protection Radius Using Chi-Square Methods-A Geometric Approach", published by Institute of Navigation in Volume V, 1998, Alexandria, Va., it was shown how for each degree of freedom parameter (dof) 13, and using the probability of false alert (pfa) 12, to determined a table of fault detection (FD) normalized thresholds (td_table of $T_D$) 14. Similarly, in the same paper, it was shown how, for each degree of freedom parameter (dof) 13, using the table of fault detection normalized thresholds (td_table of $T_D$) 14, using the probability of missed detection (pmd) 18, and using the probability of false alert (pfa) 12 to determine a table of normalized thresholds for fault detection availability (pb_table of pbiasb) 22 based on a parity vector method.

In one embodiment of the present invention, as depicted in the flow chart 30 of FIG. 1B, the step of generating the table of thresholds for the selected navigation scenario further includes the following step: for each degree of freedom parameter (dof) 13, using the probability of false exclusion (pfe) 32 to determine a table of fault exclusion (FE) normalized thresholds (te_table of $T_E$)

Historically, the inputs (pfa, pmd, pfe) were fixed (normally through a Federal Aviation Administration requirement) which resulted in one set of thresholds for a given alert rate and for a given missed detection probability. In the present invention, the RAIM/FDE thresholds are determined using the inputs of maximum allowable probability of false alert (pfa), the probability of missed detection (pmd), and the probability of false exclusion (pfe). In addition, in the present invention, these values (either probability of missed detection (pmd), or the maximum allowable probability of false alert (pfa), or the probability of false exclusion (pfe)) are allowed to change depending on the satellite configuration, expected measurement accuracy or the satellite message structure.

In one embodiment of the present invention, the satellite User Range Accuracy values are used to determine which probability of false alert (pfa) should apply. For example, the probability of false alert is set to $3.3333 \times 10^{-7}$ if any satellite URA values used in the position fix is greater than 16 meters. If all satellite URA values are less than or equal to 16 meters then the probability of false alert is set to $6.6667 \times 10^{-5}$. This decision process is made upon decoding the URA values from the satellite ephemeris message.

EXAMPLE I

A table of pre-computed and stored thresholds.

| Case # dof | Case #1 pfa = 3.3333 × 10⁻⁷ pmd = 0.001 pfe = 0.001 | | | Case #2 pfa = 6.6667 × 10⁻⁵ pmd = 0.001 pfe = 0.001 | | |
|---|---|---|---|---|---|---|
| | $T_D$ Case #1 | $T_E$ Case #1 | pbiasb Case #1 | $T_D$ Case #2 | $T_E$ Case #2 | pbiasb Case #2 |
| 1 | 5.10383 | 3.29053 | 8.19406 | 3.98792 | 3.29053 | 7.07815 |
| 2 | 5.46152 | 3.71692 | 8.47859 | 4.38539 | 3.71692 | 7.38829 |
| 3 | 5.73854 | 4.03315 | 8.68763 | 4.68560 | 4.03315 | 7.60911 |
| 4 | 5.97522 | 4.29732 | 8.85988 | 4.93879 | 4.29732 | 7.78803 |
| 5 | 6.18628 | 4.52936 | 9.00925 | 5.16259 | 4.52936 | 7.94135 |
| 6 | 6.37900 | 4.73896 | 9.14251 | 5.36564 | 4.73896 | 8.07697 |
| 7 | 6.55774 | 4.93173 | 9.26368 | 5.55301 | 4.93173 | 8.19943 |
| 8 | 6.72514 | 5.11121 | 9.37516 | 5.72792 | 5.11121 | 8.31157 |
| 9 | 6.88354 | 5.27989 | 9.47910 | 5.89265 | 5.27989 | 8.41541 |
| 10 | 7.03383 | 5.43953 | 9.57620 | 6.04884 | 5.43953 | 8.51238 |

Notations:
pfa = probability of false alert
pmd = probability of missed detection
dof = degree of freedom
$T_D$ = fault detection thresholds
$T_e$ = fault exclusion thresholds
pbiasb = normalized parity bias thresholds.

FIG. 2 is a flow chart 40 of the method of the present invention that illustrates the real-time step of selecting from the pre-computed database a plurality of thresholds corresponding to a set of currently available measurements for each timing cycle of the satellite receiver.

In one embodiment of the present invention, the timing cycle counter 54 can be implemented as follows: (a) the counter is initialized to 0 when the first fix position is determined (before the first fix position is determined it is also 0 or irrelevant); (b) the counter is incremented by one at each timing cycle (usually at 1 Hz rate); (C) during outages the timing cycle counter is reset to 0 (also when the storage capacity of the counter is overpassed).

In one embodiment of the present invention, the tracker of the set of used and available measurements 56 can be implemented as a simple measurement flag. The measurement flag is set to 0 when the set of measurements used at the current cycle is identical to the set of measurements used at a prior cycle, and to 1 elsewhere. If the measurement flag is 1 then the adaptive thresholds selection is executed regardless of other conditions (see the first test condition 58 in FIG. 2.

Referring still to FIG. 2, at the next step 66, the measurement weights for all measurement are determined and the weighting factors $\sigma_i$ are calculated to take into account the "quality" weight factor of each measurement. The calculated weighting factors $\sigma_i$ are used in the position solution fixes, or in Kalman filtering estimation process.

FIG. 3 illustrates the step 66 of FIG. 2 of determining the weighting factors $\sigma_i$ for all measurements in more details.

For each satellite available and used in the navigation solution, the user range error (URE) index (82 of FIG. 3) is inputted. The URA index (M) of each SV (satellite vehicle) is extracted from the word three from bits 13 through 16. The user range accuracy (URA) errors (in meters) for each SV are determined from the URA index (M) (an integer in the range of 0 through 15) by using the published Interface Control Document (ICD-GPS-200C) (step 84 of FIG. 3). The URE errors are due to the space segment errors and are due to the control segment errors. The space segment errors are due to the clock stability errors, the group delay stability errors, the to drift group delay stability errors, the selective availability errors, and other satellite errors. The control segment errors are due to the clock/ephemeris estimation errors, to the clock/ephemeris prediction errors, clock/ephemeris curve fit errors, other clock/ephemeris errors, the ionosphere delay model terms, and the group delay time estimate errors. The URE errors are used in the total weight factor as a signal in space (SIS) component:

$$\sigma^2_{SIS} \qquad (1)$$

Referring still to FIG. 3, at the next step 88, the user equipment errors (UEE) are evaluated based on the receiver noise, multipath, ionospheric delay, tropospheric dely, and other user segment errors. The UEE errors are used in the total weight factor as the following component:

$$\sigma^2_{rn} + \sigma^2_{mp} + \sigma^2_{iono} + \sigma^2_{tropo} \qquad (2)$$

Total user equivalent range errors (UERE) are determined in the step 92 by using both URE errors and UEE errors as follows:

$$UERE = \sqrt{(URE^2 + UEE^2)} \qquad (3)$$
$$= \sqrt{(\sigma^2_{sis}\sigma^2_m + \sigma^2_{mp} + \sigma^2_{iono} + \sigma^2_{tropo})}.$$

Referring still to FIG. 2, at the next step 71 the operator has an option to select a specific set of thresholds manually, thus overriding the determined in the prior step 66 measurement weights according to Eq. (3). The override command can be based on a specific and real-time event that was not foreseeable at the time when the adaptive threshold logic was implemented in the software of the GPS receiver. If the override command is issued, the next step is to follow the logical arrow 72 to the step 110 (of FIG. 4, please, see discussion below).

If on the other hand, no override command is issued, the next step is step 76 (of FIG. 2) to determine the composite weighting factor that is equivalent to UERE but is based on the average of the weighting factors that are attributed to each specific measurement that is available and used.

In one embodiment of the present invention, the composite weight factor is calculated as follows:

$$\sigma_{composite} = \max_i(\sigma_i); \qquad (4)$$

that is the composite weight factor is a maximum weight factor in the set of all weight factors associated with for all available and used measurements.

In another embodiment of the present invention, if all the available and used integer N measurements are from the satellites only, the composite weight factor $\sigma_{composite}$ can be determined as follows:

$$\sigma_{composite} = \sqrt{(\sigma^2_1 + \sigma^2_2 + \ldots \sigma^2_i + \sigma^2_N)/N}. \qquad (5)$$

In one more embodiment of the present invention, if, again, all the available and used n measurements are from satellites, n is an integer, the composite weight factor $\sigma_{composite}$ can be determined as follows:

$$\sigma_{composite} = \sqrt[N]{(\sigma_1 \sigma_2 \sigma_i \ldots \sigma_N)}. \quad (6)$$

In one embodiment of the present invention, if all measurements are from GPS satellites, the composite weight factor $\sigma_{composite}$ in the SPS mode is 33.3 meters, and in the PPS mode is 6.5 meters.

In one embodiment of the present invention, if all measurements are from GPS satellites, except one additional measurement that is a baro measurement, the baro weight factor $\sigma_{baro}$ is in the range between 34 meters (for a "good" case scenario), and 165 meters (for a "bad" case scenario). If this is a case, the composite (total) weight factor $\sigma_{total}$ can be determined as follows:

$$\sigma_{total} = \max(\max_i(\sigma_i), \sigma_{baro}); \quad (7)$$

or $$\sigma_{total} = \sqrt{(\sigma^2_1 + \sigma^2_2 + \ldots + \sigma^2_N + \sigma^2_{baro})/(N+1)}, \quad (8)$$

where N is a number of satellites used in the navigation solutions.

In one embodiment of the present invention, if all measurements are from GPS satellites, except one additional measurements that is a clock measurement, the clock weight factor $\sigma_{clock}$ is better than 1 meter, and can be ignored, according to Eq. (7) or Eq. (8).

In one embodiment of the present invention, after the composite weight factor is calculated in the step 74 (of FIG. 2), the next step is to make a selection of the quantities (pfa), (pmd), and (pfe) based on the calculated weight factor, and based on the selected navigation scenario, as depicted in the step 104 of flow chart 100 in FIG. 4. The used navigation scenario is selected from the group consisting of: {a Standard Positioning System (SPS) navigation scenario; a Precise Positioning System (PPS) navigation scenario; and a navigation scenario including a combination of the SPS navigation scenario and the PPS navigation scenario}.

EXAMPLE II

Selection of quantities (pfa), (pmd), and (pfe):

If $1 < \sigma_{composite} < 10$, pfa=$6.66 \times 10^{-5}$; pmd=0.001; pfe=0.001;

If $10 < \sigma_{composite} < 15$, pfa=$10^{-6}$; pmd=0.001; pfe=0.001;

If $15 < \sigma_{composite} < 35$, pfa $3.33 \times 10^{-7}$; pmd=0.001; pfe=0.001;

Referring still to FIG. 4, based on the selected probabilities (pfa), (pmd), and (pfe) calculated in step 104, and for the calculated degree of freedom (dof) (equal to the number of available measurements minus 4), the next step 110 is the step of selecting from the pre-computed off-line database of thresholds the set of thresholds $T_D$, $T_E$, and pbiasb that are most suitable for the selected-navigation scenario.

The selected set of thresholds $T_D$, $T_E$, and pbiasb are used in order (1) to start the RAIM/FDE process of fault detection availability, that is to start the computation of HPL/VPL; (2) to start the RAIM/FDE fault detection process; (3) only if the fault is detected, to start the RAIM/FDE exclusion availability process, and finally (4) to start the RAIM/FDE fault exclusion process.

If there is an operator override command, the step 104 is skipped, and the step 110 is executed based on the operator command that should include the new values for the quantities (pfa), (pmd), and (pfe).

The proposed method is in process of being implemented in the real time software of Trimble 12-channel Force-5 GPS Receiver, and upgraded version of TA-12S GPS Receiver (FAA certified).

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for improving a satellite autonomous integrity monitoring (RAIM) availability and fault detection and exclusion (FDE) function by using an adaptive threshold logic; said method comprises the steps of:

(A) pre-computing a database of thresholds including multiple sets of thresholds;

(B) selecting in real time from said database one set of thresholds, the set comprising a plurality of thresholds corresponding to a set of available measurements; and (C) determining an optimum RAIM/FDE function corresponding to said set of available measurements by using said adaptive threshold logic that utilizes said plurality of thresholds corresponding to said set of available measurements; wherein said set of available measurements is selected from the group consisting of: {a GPS measurement, a GLONASS measurement, a GALILEO measurement, a baro measurement, a clock measurement, and a pseudolite measurement}.

2. The method of claim 1, wherein said step (A) of pre-computing said database of thresholds including said multiple sets of thresholds further includes the steps of:

(A1) selecting a navigation scenario from the group consisting of: {a Standard Positioning System (SPS) navigation scenario; a Precise Positioning System (PPS) navigation scenario; and a navigation scenario including a combination of said SPS navigation scenario and said PPS navigation scenario}; and (A2) generating a table of thresholds for said selected navigation scenario.

3. The method of claim 2;

wherein said step of (A1) of selecting said navigation scenario further includes the step of:

(A1, 1) determining a degree of freedom parameter (dof) for said selected navigation scenario, wherein said dof is equal to an integer K of available measurements corresponding to said selected navigation scenario minus four measurements; and wherein said integer K of available measurements corresponding to said selected navigation scenario is selected from the group consisting of: {a GPS measurement, a GLONASS measurement, a GALILEO measurement, a baro measurement, a clock measurement, and a pseudolite measurement};

and wherein said step (A2) of generating said table of thresholds for said selected navigation scenario further includes the steps of:

(A2, 1) selecting a probability of false alert (pfa) for said selected navigation scenario;

(A2, 2) selecting a probability of missed detection (pmd) for said selected navigation scenario; and (A2, 3) selecting a probability of false exclusion (pfe) for said selected navigation scenario.

4. The method of claim 3 further including the steps of:
(A2, 4) for each said degree of freedom parameter (dof), using said probability of false alert (pfa) to determine a table of fault detection (FD) normalized thresholds (td_table of $T_D$); and
(A2, 5) for each said degree of freedom parameter (dof), using said table of fault detection normalized thresholds (td_table of $T_D$), using said probability of missed detection (pmd), and using said probability of false alert (pfa) to determine a table of normalized thresholds for fault detection availability (pb_table of pbiasb) based on a parity vector method.

5. The method of claim 3 further including the step of
(A2, 6) for each said degree of freedom parameter (dof), using said probability of false exclusion (pfe) to determine a table of fault exclusion (FE) normalized thresholds (te_table of $T_E$).

6. The method of claim 1, wherein, for each timing cycle of said satellite receiver, said step of (C) determining said optimum RAIM/FDE function corresponding to said set of available measurements by using said adaptive threshold logic further includes the steps of:
(C1) identifying a default set of available measurements by using a real time available GPS satellite constellation, and acquiring a plurality of GPS satellite signals by using a satellite receiver;
(C2) if said number of default available measurements is greater than or equal to a first predetermined number, substantially continuously determining said optimum RAIM/FDE function corresponding to said set of available measurements; and
(C3) if said number of default available measurements is less than said first predetermined number, and if at least one additional measurement is available, adding said at least one additional measurement to said set of available measurements and repeating said steps (C1–C3); wherein said additional measurement is selected from the group consisting of: {GPS measurement, GLONASS measurement, GALILEO measurement, a baro measurement, a clock measurement, and a pseudolite measurement}.

7. The method of claim 6, wherein, for each timing cycle, said step (C2) of continuously determining said optimum RAIM/FDE function corresponding to said set of available measurements further includes the steps of:
(C2, 1) counting an integer L of timing cycles by using a counter;
(C2, 2) tracking said set of used available measurements; and
(C2, 3) if said integer L of timing cycles is not a multiple of a second predetermined number, or if said integer L of timing cycles is not equal to one; or if said set of tracked used available measurements does not change from a prior timing cycle, starting the process of determining said optimum RAIM/FDE function.

8. The method of claim 6, wherein, for each timing cycle, said step (C2) of continuously determining said optimum RAIM/FDE function corresponding to said set of available measurements further includes the steps of:
(C2, 1) counting an integer L of timing cycles by using a counter;
(C2, 2) tracking said set of used available measurements; and
(C2, 3) if said integer L of timing cycles is a multiple of said second predetermined number, or if said integer L of timing cycles is equal to one; or if said set of tracked used available measurements does change from a prior timing cycle, starting a process of selecting a set of adaptive thresholds.

9. The method of claim 8, wherein said step (C2, 3) of selecting said set of adaptive thresholds further includes the steps of:
determining a set of measurement weights;
checking if there is an operator's overrule command;
if there is no operator's overrule command, determining a composite weighting scalar factor by using said set of measurement weights;
based on said composite weighting scalar factor, selecting a navigation scenario from the group consisting of: {a Standard Positioning System (SPS) navigation scenario; a Precise Positioning System (PPS) navigation scenario; and a navigation scenario including a combination of said SPS navigation scenario and said PPS navigation scenario}; and
based on said selected navigation scenario, and based on said degree of freedom (dof), selecting from said pre-computed off-line database of thresholds a set of thresholds including said table of fault detection (FD) normalized thresholds (td_table of $T_D$);including said table of fault exclusion (FE) normalized thresholds (te_table of $T_E$); and including said table of normalized thresholds for fault detection availability (pb_table of pbiasb).

10. The method of claim 8, wherein said step (C2, 3) of selecting said set of adaptive thresholds further includes the steps of:
determining a set of measurement weights;
checking if there is an operator's overrule command;
if there is an operator's overrule command, based on said operator's overrule command, selecting a navigation scenario from the group consisting of: {a Standard Positioning System (SPS) navigation scenario; a Precise Positioning System (PPS) navigation scenario; and a navigation scenario including a combination of said SPS navigation scenario and said PPS navigation scenario}; and
based on said selected navigation scenario, and degree of freedom (dof), selecting from said pre-computed off-line database of thresholds a set of thresholds including said table of fault detection (FD) normalized thresholds (td_table of $T_D$); including said table of fault exclusion (FE) normalized thresholds (te_table of $T_E$); and including said table of normalized thresholds for fault detection availability (pb_table of pbiasb).

11. The method of claim 9, wherein said step of determining said set of measurement weights further includes the steps of:
decoding from a received GPS navigation message a user range accuracy (URA) index for each said satellite measurement that is used in a navigation solution;
determining a user range error (URE) corresponding to a plurality of errors selected from the group consisting of {a plurality of space segment errors; and a plurality of control segment errors} for said URA index for each said satellite measurement;
evaluating a user equipment error (UEE) corresponding to a plurality of errors selected from the group consisting of {a receiver noise error; a multipath error; a ionosphere delay uncompensated error; and a troposphere delay uncompensated error} for each said satellite measurement; and
determining a user equivalent range error (UERE) based on said calculated URE and based on said calculated UEE for said URE value for each said satellite measurement.

* * * * *